F. SCHNEIBLÉ.
BEER DISPENSING APPARATUS.
APPLICATION FILED APR. 7, 1914.

1,133,405.

Patented Mar. 30, 1915.

Attest:
W. J. McGinn
Worthington Campbell by

Inventor:
Frank Schneiblé
Redding, Greeley & Goodlett
Atty's.

UNITED STATES PATENT OFFICE.

FRANK SCHNEIBLÉ, OF NEW YORK, N. Y., ASSIGNOR TO CARL A. SCHNEIBLE, OF NEW YORK, N. Y.

BEER-DISPENSING APPARATUS.

1,133,405.  Specification of Letters Patent.  Patented Mar. 30, 1915.

Application filed April 7, 1914. Serial No. 830,128.

*To all whom it may concern:*

Be it known that I, FRANK SCHNEIBLÉ, a citizen of the United States, residing in the borough of Manhattan of the city of New York, in the county of New York, in the State of New York, have invented certain new and useful Improvements in Beer-Dispensing Apparatus, of which the following is a specification, reference being had to the accompanying drawings, forming a part hereof.

This invention relates to an improved system for dispensing beer or other liquids in the dispensing of which there is encountered this difficulty, that when the source of supply is exhausted or about exhausted, foam, and other undesirable substances carried by the liquid are drawn into the receiving receptacle. The invention is concerned not only with the improved system by which it becomes impossible for such foam, etc., to be drawn into the receiving receptacle such as, for instance, a glass, but also with the apparatus in which the system is employed.

The principal object of the invention is to provide such an apparatus which is relatively simple in construction and easy of manipulation and, during the withdrawal of the beer from a source of supply, such as a keg, is automatic in its action to prevent positively the passage of foam from the source of supply to the glass.

A further object of the invention is to embody in the approved apparatus suitable devices to permit ready disconnection of one source of supply therefrom and the introduction into the system of another source of supply. These last named devices furthermore permit all foam, etc., to be discharged from the system through a suitable exhaust vent before the fresh beer from the new source of supply is passed to the glass.

The invention will be described more particularly with reference to the accompanying drawings in which—

Figure 1:
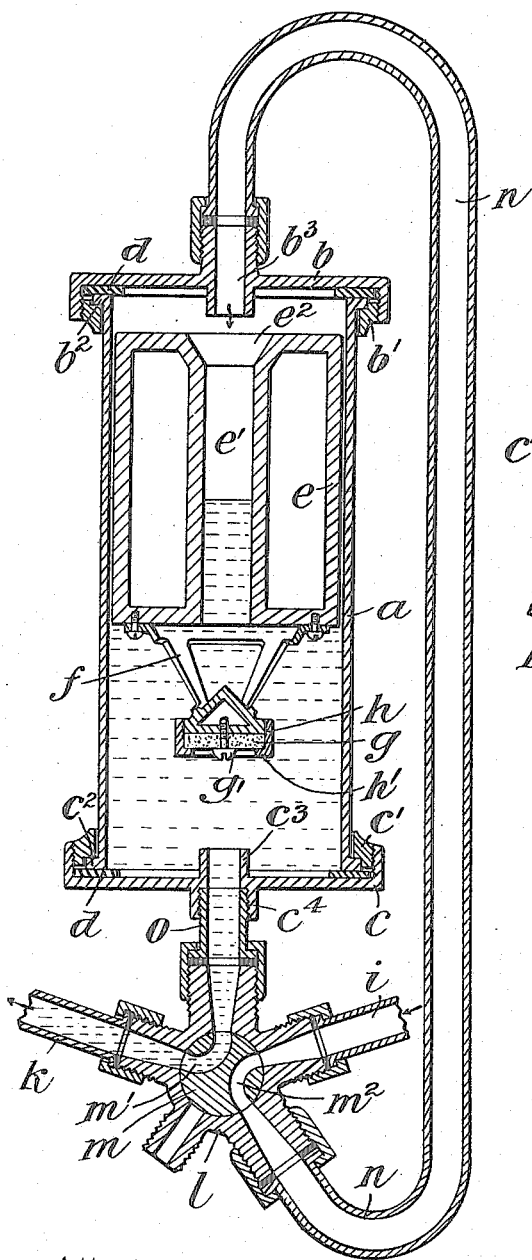
Figure 2:
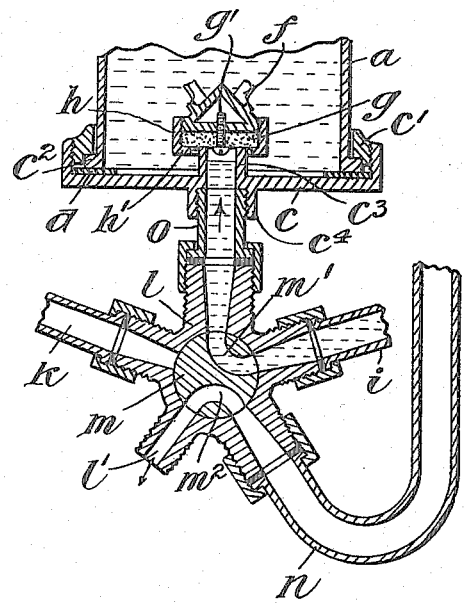

Figure 1 is a view in vertical section of the improved apparatus by which the invention may be practised, the source of supply and the dispensing conduit being indicated. Fig. 2 is a fragmentary view of the apparatus shown in Fig. 1 showing the controlling switch in position to permit the tapping of a new keg.

The improved apparatus includes a float chamber which may be composed of a cylinder $a$ of glass or other material having united therewith a top $b$ and a bottom $c$ through threaded engagement respectively with collars $b'$ and $c'$ encircling the cylinder $a$ and engaging respectively annular flanges $b^2$ and $c^2$ formed adjacent the ends of the cylinder. Interposed between the cylinder $a$ and its ends $b$ and $c$ may be placed suitable washers $d$ to insure a fluid tight connection. Within the float chamber above described is a cylindrical float $e$ adapted to move freely in an axial direction within the float chamber and provided interiorly with a circular passage $e'$ to permit the flow therethrough of the fluid to be dispensed, as will hereinafter appear. On the bottom of the float is secured a spider $f$ on the lower end of which is mounted a valve $g$, preferably of some yielding material, which may be removably secured to the spider by means of a screw $g'$. For the purpose of holding the valve $g$ in position and to guide the same in its travel to its seat, there is provided a sleeve $h$ which is in threaded engagement with the spider $f$ and has formed on its lower end a circular flange $h'$ to embrace the bottom of the valve $g$ adjacent its periphery. Formed integral with the bottom $c$ of the float chamber is an inwardly extending sleeve $c^3$ and an outwardly extending sleeve $c^4$ in substantial alinement with each other and through which the beer may flow from the float chamber to the dispensing system as will appear later. On the upper end of the sleeve $c^3$, the valve $g$ is adapted to seat when the beer is so far exhausted from the float chamber as to permit the float to drop and bring the said valve on to the sleeve $c^3$. In this connection, it is to be noted particularly that the flanged sleeve $h$ is of such internal diameter as to permit its free passage over the sleeve $c^3$.

Interposed between the source of supply, such as a keg, connected with the supply pipe indicated at $i$, and the float chamber, and interposed between the float chamber and the discharge or dispensing pipe $k$, is a valve, indicated generally by the reference character $l$, in which is a rotatable plug $m$ to control the five passages leading from the said valve as will now be described. From the valve $l$ extends a connecting pipe $n$ communicating with the upper part of the float chamber through a passage $b^3$ formed in the top wall $b$ of the chamber. Communicating with the sleeves $c^3$ and $c^4$ or discharge passage in the bottom wall $c$ of the float chamber is a pipe $o$ which is also connected to the valve $l$.

From Fig. 1 it appears that the plug $m$ with its interior passages $m^1$ and $m^2$ may be so positioned within the valve body $l$ as to place the supply pipe $i$ in communication with the pipe $n$ and the upper portion of the float chamber. When the plug is in this position the discharge passage in the bottom wall $c$ of the float chamber is placed in communication, through the pipe $o$ and passage $m'$ in the plug $m$, with the dispensing pipe $k$. When beer is withdrawn from the dispensing pipe $k$ through the usual control faucet, it is also withdrawn, of course, from the float chamber and the float $e$ tends to fall as the level of the beer falls. However, coincident with this flow of beer from the float chamber, a fresh supply inflows constantly through the pipe $n$ and maintains the level of the beer within the float chamber substantially uniform. To facilitate the free inflow of beer into the upper portion of the float chamber without subjecting the float $e$ to the pressure of such inflowing beer, the central passage $e'$ through the float is flared outwardly at its upper end as at $e^2$ and such flared portion is maintained in substantial alinement with the passage $b^3$.

Assuming now that the beer is exhausted from the keg, as is the condition illustrated in Fig. 1, it will be evident that continued withdrawal of beer from the dispensing pipe $k$ and float chamber will result in the lowering of the beer level in the float chamber and a drop of the float $e$ to an extent sufficient to seat the valve $g$ and prevent further outflow of the beer. When the valve $g$ is seated it will be observed that, by reason of the height of the spider $f$ a beer trap always remains in the float chamber to prevent the flow of foam, etc., from the empty beer keg through the connecting passages to the dispensing pipe $k$. When the system is in the condition illustrated in Fig. 1 the supply pipes from the empty beer keg and the greater part of the float chamber are filled with air and foam, but this air and foam cannot flow through to the receiving receptacle and so destroy the quality of the beer last dispensed or to be dispensed.

After the empty keg has been disconnected from the supply pipe $i$ a fresh keg may be tapped on to said pipe but if the fresh beer were permitted to flow immediately from this fresh keg, through the pipe $n$ and the float chamber into the dispensing pipe $k$, it is evident that it would carry before it all of the entrapped air and foam and the first few glasses of beer dispensed would be of such quality as to render them unfit for serving. It is this condition which now obtains in systems generally in use and which it is one of the primary objects of this invention to overcome. In accordance with the invention embodied in the improved apparatus, the plug $m$, is turned to the position illustrated in Fig. 2 before the new keg is tapped on to the supply pipe $i$, thus cutting off the dispensing pipe $k$ from every portion of the system and placing the supply pipe in communication with the lower portion of the float chamber through the passage $m'$ and connecting pipe $o$. When the plug $m$ is thus positioned the other passage $m^2$ therein is moved to place the pipe $n$ in communication with an exhaust vent $l'$ formed in the valve $l$. The fresh beer now flows upward into the float chamber so as to raise the valve $g$ from its seat and this flow of fresh beer continues until the float chamber is entirely filled with beer and all of the air formerly entrapped in the said chamber is forced into the pipe $n$. The continued inflow of fresh beer carries it on through the pipe $n$, thus forcing the entrapped air out through the exhaust vent $l'$, until the beer itself is vented through the said exhaust $l'$. The attendant in control of the apparatus at this time turns the plug $m$ so as to place the system in its normal dispensing condition, that is to say, with the fresh keg in communication with the inflow pipe $n$ and the float chamber in communication with the dispensing pipe $k$. It will be evident that the continued dispensing of the beer will not result in the withdrawal of any air, or the like, inasmuch as all of such obnoxious elements have been exhausted from the system in the manner described.

From the description given it will be evident that when the valve $g$ is seated as illustrated in Fig. 2, no beer can be drawn through the system from the beer keg until after the controlling plug $m$ has been positioned in the valve in the manner illustrated whereby beer is permitted to flow into the chamber $a$ beneath the float and raise the valve $g$ from its seat. If it were attempted to pass fresh beer through the pipe $n$ and into the float chamber when the valve $g$ is seated, the pressure of air in the float chamber would be such as to render the entire apparatus inoperative and to maintain the valve $g$ on its seat.

Other apparatus than that herein illustrated may be employed to bring about the automatic checking of the beer flow when the keg is exhausted and to necessitate a reverse flow of beer from the fresh keg through the system before the parts are restored to normal operating condition, and all such apparatus are to be deemed within the scope of this invention provided they accomplish the desired results pointed out herein and fall within the scope of the appended claims.

I claim as my invention:—

1. Apparatus for dispensing beer or the like, comprising a supply pipe, a discharge pipe, a float chamber normally interposed between the source of supply and the discharge point, a float within the chamber, means controlled by the float to check automatically the flow of beer to the discharge point before the supply is exhausted, and means for establishing separate communication between the supply and the float chamber to permit the inflow to the chamber of fresh beer when the supply is replenished.

2. Apparatus for dispensing beer including a supply pipe and a dispensing pipe interconnected by passages, a float chamber interposed in said connection to check automatically the flow of beer before the supply is exhausted and a valve with which said passages connect, said valve permitting the source of supply to be connected to the float chamber through one of two independent passages and controlling communication between the float chamber and the dispensing pipe.

3. Apparatus for dispensing beer or the like, comprising a supply pipe, a discharge pipe, a float chamber interposed normally between the supply pipe and the dispensing pipe, a valve controlled by said float for automatically checking the flow of beer before the supply is exhausted, a valve to place the supply in direct communication with the beer in the float chamber subsequently to the checking of the flow to restore the valve to normal position and exhaust the air from the float chamber and its connections, said valve being operable to restore the apparatus to normal operating conditions.

4. Apparatus for dispensing beer or the like, a float chamber interposed between the source of supply and the dispensing pipe, a float within the chamber to cut off communication between the supply and the dispensing pipe before the supply is exhausted, and means to discharge the contents of the apparatus before reëstablishing normal communication between the fresh supply and the dispensing pipe.

5. Apparatus for dispensing beer or the like, comprising a supply pipe, a discharge pipe, a float chamber interposed between the source of supply and the dispensing pipe, a float within the chamber operable to stop automatically the flow of beer when the level of the beer in the chamber falls to a predetermined degree, a valve operable to place the float chamber in communication with the supply when replenished and with an exhaust vent whereby upon the flow of fresh beer into the chamber the contents therein and the connections thereto will be vented, and connections controlled by the valve for reëstablishing communication between the float chamber and the dispensing pipe.

6. Apparatus for dispensing beer or the like, comprising a supply pipe, a discharge pipe, a float chamber interposed between the source of supply and the dispensing pipe, a float within the chamber operable to stop the flow of beer automatically when the level of the beer in the chamber falls to a predetermined extent, and a valve operable to place the float chamber in communication with the supply when replenished and simultaneously with an exhaust vent whereby upon the flow of fresh beer into the chamber the contents in the chamber and the connections thereto will be discharged, said valve being operable to reëstablish communication between the float chamber and the dispensing pipe and to cut off said exhaust vent.

7. Apparatus for dispensing beer or the like, comprising a supply pipe, a discharge pipe, a float chamber, a connection to the upper end thereof from the source of supply, a connection from the lower end thereof to the dispensing pipe, means to place the lower end in communication with the source of supply, means for placing an exhaust vent in communication with the upper end of the float chamber, said means including a valve to control all of said connections, a float within the chamber having a passage therethrough to permit the free flow of beer, a spider carried on the float, and a valve carried by the spider and controlling the outflow passage from the chamber whereby when the beer level falls the float will seat the valve before the supply of beer is exhausted thus forming a beer trap, the valve permitting the subsequent connection of the fresh supply with the outflow passage of the chamber to unseat the valve and permit reverse flow of the fresh beer through the system to exhaust the entrapped contents.

This specification signed and witnessed this second day of April A. D., 1914.

FRANK SCHNEIBLÉ.

Signed in the presence of—
 E. M. TAYLOR,
 WORTHINGTON CAMPBELL.